United States Patent [19]

Berg

[11] 4,252,296
[45] Feb. 24, 1981

[54] VALVE

[76] Inventor: John W. Berg, 1111 Morse Ave., #35, Sunnyvale, Calif. 94086

[21] Appl. No.: 961,531

[22] Filed: Nov. 17, 1978

Related U.S. Application Data

[60] Continuation-in-part of Ser. No. 749,818, Dec. 13, 1976, which is a division of Ser. No. 630,415, Nov. 10, 1975, Pat. No. 4,031,705, which is a continuation-in-part of Ser. No. 524,262, Nov. 15, 1974, abandoned.

[51] Int. Cl.³ .................... F16K 7/00; F16K 31/10
[52] U.S. Cl. .................. 251/138; 251/129; 251/282; 251/61.2; 137/269
[58] Field of Search ............... 251/282, 138, 61.2, 251/129; 137/269

[56] References Cited

U.S. PATENT DOCUMENTS

| | | | |
|---|---|---|---|
| 2,186,024 | 1/1940 | Iler | 251/282 X |
| 3,304,048 | 2/1967 | Roberts | 251/282 X |
| 3,719,343 | 3/1973 | Werra | 251/61.2 X |
| 3,805,203 | 4/1974 | Deckard | 251/129 X |
| 3,985,333 | 10/1976 | Paulsen | 251/282 X |
| 4,074,700 | 2/1978 | Engle | 251/282 X |

*Primary Examiner*—Arnold Rosenthal
*Attorney, Agent, or Firm*—Owen, Wickersham & Erickson

[57] ABSTRACT

A piston-like member slides within a valve body, with one end sealingly engageable against a valve seat communicating with an inlet port. The other end of the piston-like member forms a movable wall of an expansible chamber which, when it expands, moves the member toward valve closure. Preferably, both ends of the piston-like member are engaged against diaphragms, one of which seals against the valve seat to close the valve and the other of which serves as the movable wall of the expansible chamber. The valve may be solenoid operated, preferably with a solenoid of linear force characteristics, the solenoid being connected to the piston-member via a pivoted arm. The solenoid-controlled valve can be used to control the flow of a very highly pressurized or large-volume inlet fluid with a relatively low solenoid force by connecting the expansible chamber with inlet pressure, so that inlet pressure acts on both ends of the piston-like member, tending to balance forces. Without solenoid operation, the valve can serve as a relief valve or as a pilot operated valve with pilot pressure connected to the expansible chamber. The valve can also serve as a pressure regulator for establishing a constant ratio of outlet pressure to inlet pressure, by connecting the valve outlet with the expansible chamber, with the expansible chamber diaphragm being of larger effective area than the valve closure diaphragm.

11 Claims, 3 Drawing Figures

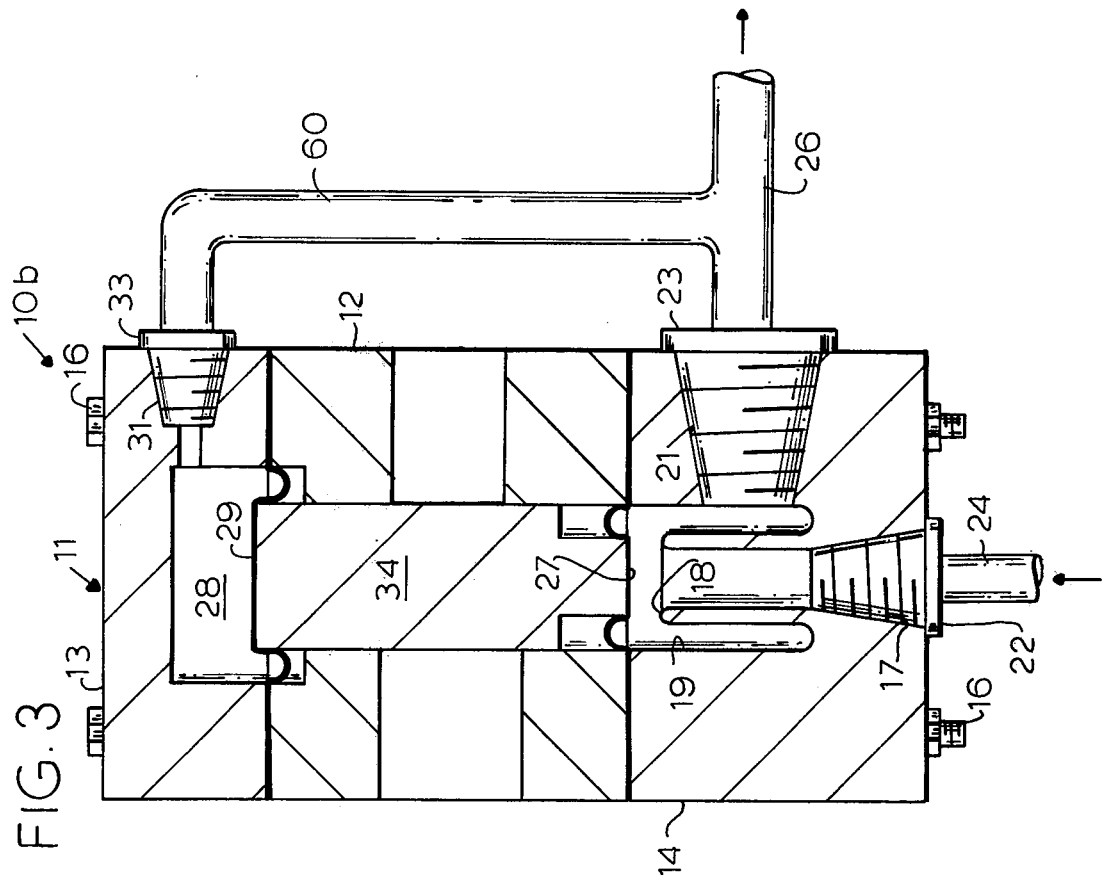
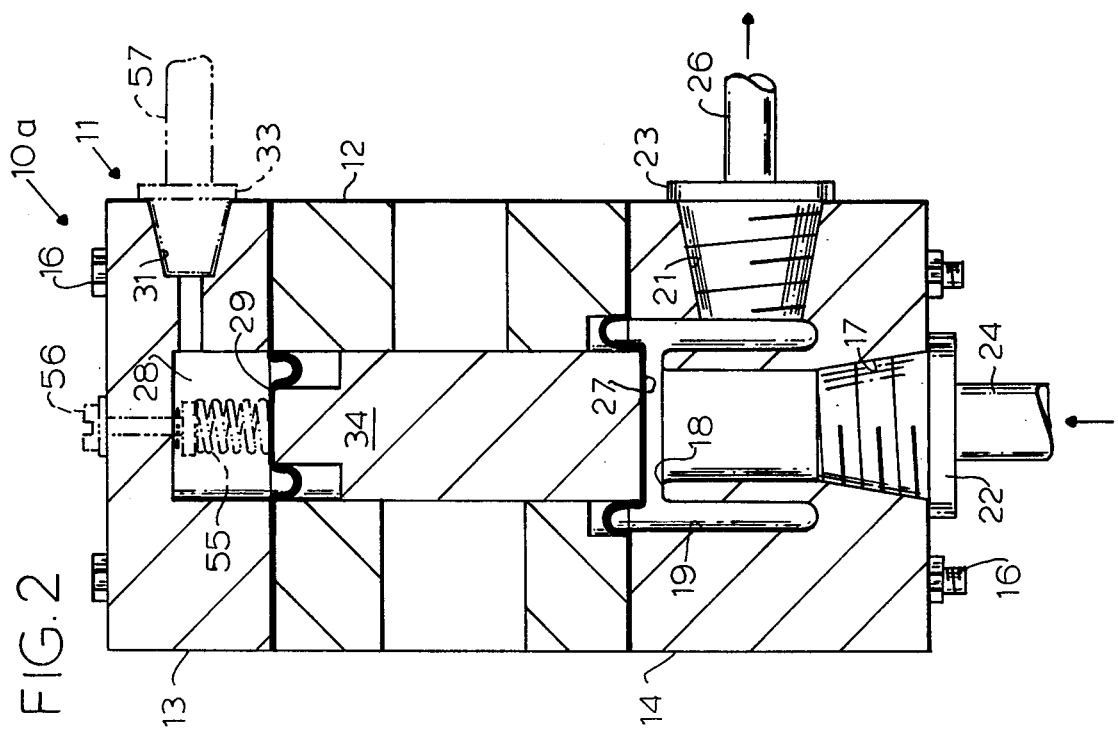

VALVE

RELATED PATENT APPLICATIONS

This application is a continuation-in-part of application Ser. No. 749,818, filed Dec. 13, 1976, which was a division of application Ser. No. 630,415, filed Nov. 10, 1975 (now U.S. Pat. No. 4,031,705, issued June 18, 1977), which was a continuation-in-part of application Ser. No. 524,262, filed Nov. 15, 1974, now abandoned.

BACKGROUND OF THE INVENTION

The invention relates to fluid valves, and more particularly to an improved valve structure which can be utilized as a soleniod-operated, high-pressure or large-volume valve, a relief valve, a pilot-operated valve, or a pressure regulator.

A myriad of different valve structures have been suggested. However, for economy of manufacture, interchangeability of parts and economy of maintenance, there has been a need for a versatile valve structure useful for a number of different purposes in a system or for different systems.

In systems where remotely or automatically controlled valves are required to regulate the flow of very high inlet pressures, which may be at a high volume flow rate, often a valve actuator such as a solenoid is incapable of developing the required force to close or restrict the flow through the valve. Linkage leverage can be increased, but a solenoid of practical and economical design has a limited useful stroke, so that it is difficult to provide an adequate range of control along with adequate controlling force at such high pressures. There has been a need for a valve of simple and economical design which provides for the regulation of very high inlet pressures, with complete dependability, by electrical or other remotely controlled means without requiring a great deal of controlling force such as can be provided by servo-motors and other such more elaborate devices.

SUMMARY OF THE INVENTION

The present invention provides a simple and economically manufactured valve structure having a great variety of practical uses, including that of controlling the flow of high pressure or high flow volume fluids with relatively low force provided by a solenoid. The valve structure includes a valve body having an inlet port connected to a preferably annular valve seat with a valve closure means reciprocable toward and away from the valve seat to control fluid flow, and an outlet chamber and port downstream of the valve seat. Also included in the valve body is an expansible fluid chamber having a movable wall or member responsive to fluid pressure in the chamber, and some type of connecting means—mechanical or hydraulic—between the movable wall and the valve closure member, so that pressure in the expansible chamber tends to move the valve toward closure, and the opening of the valve is always subject to the resisting force of whatever pressure exists in the expansible chamber. The connector may be a simple piston-like member slidable in the valve body, with one end forming or supporting the valve closure means and the other end forming the wall of the expansible chamber. Diaphragms are preferably positioned over both ends of the slidable member, one forming a sealing surface for the valve seat and sealing the slidable member against leakage, and the other forming the movable wall of the expansible chamber while preventing leakage at that end of the slidable member.

The expansible chamber may be connected to receive inlet fluid pressure, so that no matter how high the inlet pressure, the forces on the two ends of the slidable piston-like member are at least partially balanced, depending on the ratio of the effective areas of the two diaphragms or other pressure-responsive devices. Thus, a very low degree of actuating force is all that is necessary to control the high pressure fluid flow through the valve to the outlet. The control is preferably provided by a mechanical linkage arm linking the slidable piston-like member with a solenoid armature. If the valve is to be normally open, the armature is arranged so as to pull the valve closed when it is energized. A spring may be connected to the armature, the linkage member, or the slidable member to urge the valve toward the open position. The diaphragms, in the case of this type valve, are preferably of about equal effective area or with the valve closure diaphragm of somewhat larger effective area, depending on whether a spring is used, and if so, the stiffness of the spring.

For such a flow control valve, it is often desirable to provide for linear solenoid control, i.e. a solenoid that produces a substantially constant power output throughout the stroke of the armature, and thus always yields a linear response to changes in the amount of current fed through the solenoid's field coil. This is accomplished according to the invention through the provision of a field coil including a non-magnetic bearing sleeve surrounded by the field coil winding and defining a hollow core for the armature, open at its outer end, with a magnetic metal housing surrounding the winding. The metal housing includes a substantially flat magnetic metal surface adjacent the inner end of the hollow core, substantially perpendicular to the axis of the core. The armature itself is shaped as a steadily tapered body, preferably including a generally hemispherical, enlarged inner end and a conical portion extending therefrom to the outer, small end. Thus, the armature is generally teardrop shaped. This configuration has been found to produce a substantially flat force vs. stroke curve. This enables flow volume to be controlled closely by control of the current flow.

The valve structure of the invention may of course be controlled by other type actuators instead of a solenoid. In any event, the described inner connection between the inlet and the expansible chamber provides for control of the valve through a linkage arm with very little force.

The valve is also useful in a number of applications which do not include the use of a mechanical linkage arm. It can serve as a relief or in-line threshold valve, with biasing pressure urging the valve closed, introduced via the expansible chamber. Such pressure may be either by means of a spring acting on the slidable piston-like member in the direction of valve closure, with an open breather port leading from the expansible chamber, or by means of gas pressure within the chamber, with the port closed, or gas or liquid pressure connected to pressure in another part of the system being served.

The valve structure of the invention may also serve as a pilot operated valve, with the expansible chamber port connected to a source of controlling pilot pressure.

In another application, the valve of the invention can serve as a pressure regulator valve. For this use the expansible chamber diaphragm is structured to have an effective area which is a prescribed proportion larger than the effective area of the valve closure member diaphragm, which is subjected directly to inlet pressure. The outlet port of the valve is interconnected with the expansible chamber port, as well as leading to the space whose pressure is to be regulated. This maintains the space at substantially a preselected fraction of the inlet pressure.

In one embodiment, a multiple purpose fluid valve structure according to the invention comprises a valve body; an inlet port in the valve body; a valve seat in the valve body communicating with the inlet port; valve closure means positioned adjacent to the valve seat in the path of fluid pressure therethrough and mounted in the valve body for movement into seating engagement with and away from the valve seat; a fluid exit chamber adjacent to the valve seat and closure means, and an outlet port in communication therewith; expansible fluid chamber means formed in the valve body and having a movable member responsive to the fluid pressure in the chamber means, with the valve body including a port in communication with the chamber means; and a piston-like valve member slidably mounted in the valve body between the valve seat and the expansible fluid chamber means, having one end forming the valve closure means and an opposite end serving as a movable member.

Accordingly, among the objects of the invention is to provide an improved fluid valve structure useful and interchangeable in a number of different valving applications, the structure being relatively simple and inexpensively produced. These and other objects, advantages and features of the invention will be apparent from the following description of the preferred embodiment, taken in conjunction with the accompanying drawings.

DESCRIPTION OF THE DRAWINGS

FIG. 2 is a sectional view of the valve of the invention, for use as a relief valve or a pilot operated valve.

FIG. 3 is a sectional view of the valve connected to so as to serve as a pressure regulator.

DESCRIPTION OF THE PREFERRED EMBODIMENTS

Figure 1:
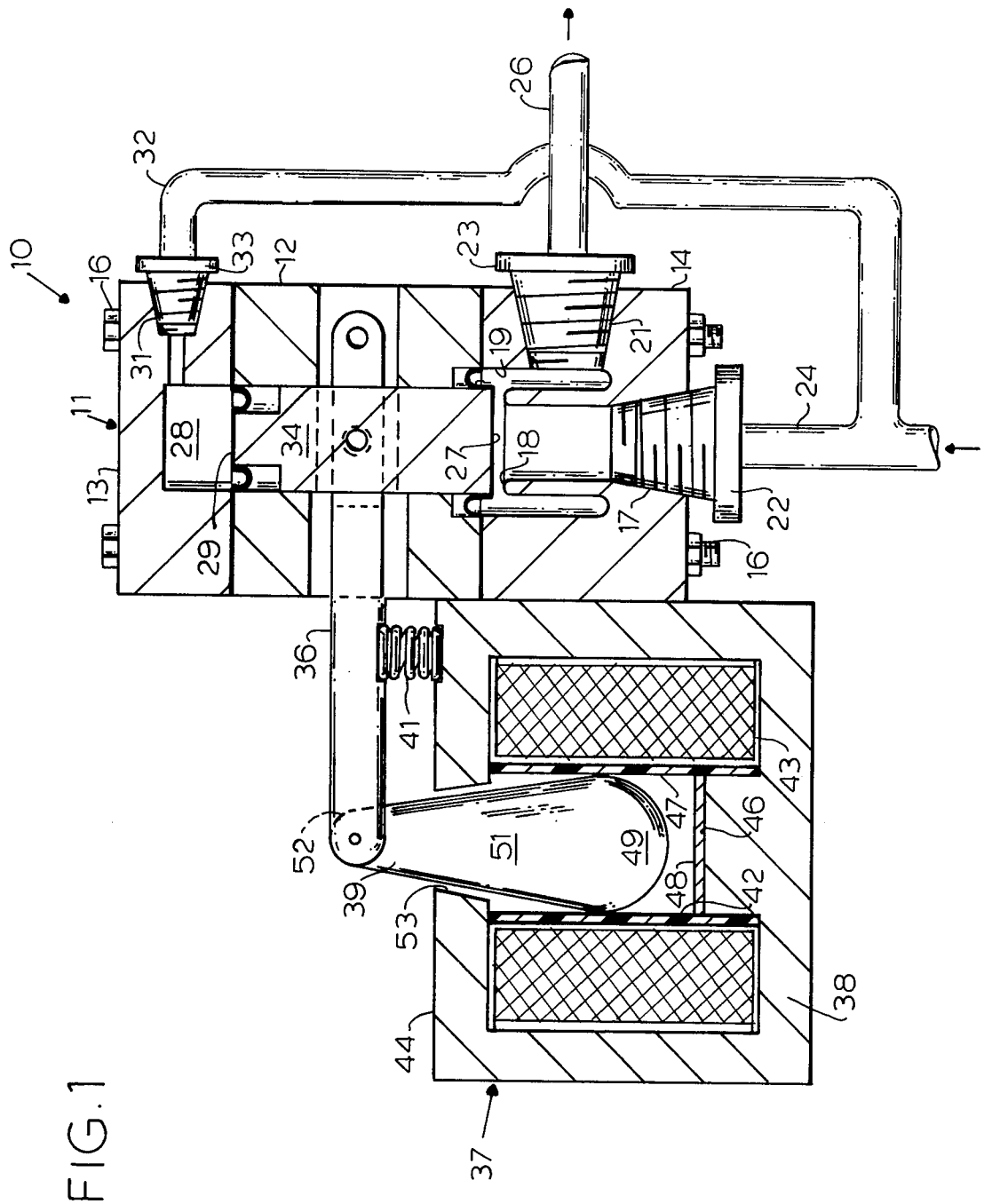
FIG. 1 is a sectional view of a valve according to the invention, shown with solenoid actuation.

FIG. 1 shows a valve structure 10 according to the invention including a body 11 made up of a central portion 12 and two opposed end portions 13 and 14, which are preferably secured together by means of bolts 16. The valve body 11 includes an inlet port 17 leading to a valve seat 18 which is preferably annular, but may also be of other shapes, and an outlet chamber 19 communicating with an outlet port 21. These components may be formed in the valve body portion 14 as shown. Connectors 22 and 23 may be used to connect the inlet and outlet portions with inlet and outlet lines 24 and 26, respectively.

Cooperating with the valve seat 18 is a valve closure member 27, reciprocable between a position of sealing engagement with the seat 18 and a retracted position as shown. This member 27 is preferably an elastomeric diaphragm as shown, sandwiched between the valve body portions 12 and 14 so as to completely and effectively seal the exit chamber 19 against leakage toward the upper areas of the valve body.

At the other end 13 of the valve body is formed an expansible chamber 28, with a movable member 29 subjected to fluid pressure in the chamber 28. A port 31 is provided to connect the chamber 28 with a line 32, via a connector 33, or with the exterior of the valve body 11. The movable wall or member 29 of the expansible chamber 28, like the valve closure member 27, is preferably a resilient diaphragm as shown. This provides for complete sealing without the use of O-rings or other such sealing devices.

The two diaphragms 27 and 29 are connected together for movement in unison. This may be accomplished in a simple and efficient manner by the use of a piston-like member 34 slidably mounted in the valve body as shown. The diaphragms 27 and 29 rest against the opposed ends of the member 34 as indicated, and as one diaphragm is moving in an expanding direction in response to fluid pressure, the other diaphragm is retracting, moving toward the fluid pressure. If diaphragms are not used, the ends of the member 34 may act as the valve closure 27 and the movable member 29, with appropriate sealing means to prevent movement of fluid along the member 34.

In the embodiment shown, the slidable piston-like member 34 is connected to a mechanical linkage 36, preferably comprising an actuator arm or lever as shown. The valve of FIG. 1 is so structured and connected as to provide for full control of high pressure and/or high flow rate fluids at the inlet port 21 by means of relatively low force on the actuator arm 36. Thus, the inlet line 24 is connected via the line 32 to the port 31 of the expansible chamber 28, so that inlet pressure is always present at both the valve seat 18 and the expansible chamber 28. This tends to equalize the forces acting on the slidable member 34 (or other suitable interconnection means between the two diaphragms). The force required to close or restrict flow through the valve is therefore very light. The expansible chamber diaphragm 29 is preferably of smaller effective area than the valve closure diaphragm 27, but the two may be equal in area if desired, depending upon whether the valve is normally open or normally closed, depending on spring forces acting on the actuator arm 36, etc.

The valve may be controlled by a solenoid generally indicated at 37, including a field coil 38 and an armature 39 which is connected to the actuator arm 36. The valve shown is normally open, with the valve closure diaphragm 27 being the larger and with the inclusion of a spring 41 as illustrated. As discussed above, the solenoid 37 preferably is structured to provide for linear response to current adjustments for accurate and dependable flow control. To this end, the field coil includes a non-magnetic sleeve 42, preferably plastic, surrounding the armature 39, the sleeve itself being surrounded by the field coil winding 43. A magnetic metal housing 44 surrounds the entire periphery of the winding 43, and a surface 46 of the housing at the inner end of the bore or hollow core 47 formed by the sleeve 42 is substantially flat as shown. A non-magnetic stop 48, which may be aluminum or plastic, may be positioned over the flat surface 46 at the end of the bore. The armature 39 itself is generally teardrop-shaped as shown, with an enlarged inner end 49 which is generally hemispherical and a tapered conical portion 51 leading outwardly to a small end 52. These structural characteristics have been found to produce substantially flat force-stroke curve characteristics. For optimum results, it has been found preferably to have a conical housing opening 53 leading out from the bore 47, with the walls of the opening 53 generally parallel to the tapered conical portion 51 of the armature.

It should be understood that the solenoid 37 (or any other actuator connected to the actuator arm 36) may be positioned to open the valve, rather than to close it as shown in the drawing. A normally closed valve would of course have a different spring biasing arrangement and perhaps different relative diaphragm effective areas. Also, it should be understood that other types of actuating means can be connected to control the valving assembly of FIG. 1. This may include other electrical devices or mechanical, hydraulic, pneumatic apparatus, or the lever arm 36 may even be controlled by hand.

FIG. 2 shows the valve structure 10a without any mechanical linkage connected to the piston-like slidable member 34. In this configuration the valve is useful as a relief or threshold valve, or as a pilot operated valve. As described herein and in the claims, the term "relief" valve is intended to include any valve operable to open at or above a threshold pressure. In the case of a relief valve, a biasing spring 55 (dashed lines) may be included, and the spring 55 may be made adjustable by the inclusion of an adjustment screw 56. In this case the port 31 would remain open. Alternatively, or in addition to the spring 55, the port 31 may be plugged or connected to a closed or pressure regulated space, with gas pressure acting against the member 29, so that gas pressure provides or augments the biasing force for urging the valve toward the closed position.

In the case of a pilot operated valve, the spring 55 and screw 56 are omitted, and a line 57 leads from the expansible chamber port 31 to a source of controlling pilot pressure.

The relative effective areas of the diaphragms 27 and 29 of the valve of FIG. 2 may be selected as desired, depending on the relative pressures to be acting upon the two diaphragms and the threshold pressure desired for the relief valve. In the case of a relief or threshold valve, it may be desirable to have an adjustable threshold pressure which depends upon pressure in another part of the system being served. For such a situation the line 57 from the expansible chamber 28 may lead to such other pressure, whether gas or liquid, with the relative diaphragm sizes appropriately selected. Thus, the valve would be a form of pilot/relief valve, or variable-threshold relief valve.

FIG. 3 shows the valve structure 10b as a pressure regulator valve for maintaining pressure in a downstream space at a predetermined proportion of inlet pressure. The diaphragm 29 is in this case of larger effective area than the valve closure diaphragm 27. The outlet port 21 is connected to the expansible chamber port 31, preferably by a line 60 leading from the port 31 into the outlet line 26 from the outlet port. The line 26 also leads to the downstream space whose pressure is to be regulated. It can be seen that the valve closure diaphragm 27 will remain engaged against the valve seat 18, closing the valve, so long as pressure in the downstream space (and in the chamber 28) remains at or above a preselected fraction of the inlet pressure. However, when pressure in the space falls below that preselected fraction, the chamber diaphragm 29 will yield to the superior force associated with inlet pressure, acting in the opposite direction, and the valve will open until the preselected proportion between the two pressures is again reached.

Of course, if inlet pressure fluctuates, the regulated pressure in the downstream space may at times be higher than the preselected fraction of inlet pressure. This may be desirable in some situations.

The above described preferred embodiments provide a valve structure which is relatively simple in construction and economical in production, yet which is versatile in its application to a variety of valving situations. Various other embodiments and variations to these preferred embodiments will be apparent to those skilled in the art and may be made without departing from the spirit and scope of the following claims.

I claim:

1. A solenoid-controlled fluid valve adapted to control high flow pressures and flow rates with relatively low force, comprising:
   a solenoid having a field coil including a housing and a winding, and an armature movable within the field coil between an inner and an outer position;
   a valve comprising
   a valve body,
   an inlet port in the valve body,
   a valve seat in the valve body communicating with the inlet port,
   a first diaphragm positioned adjacent to the valve seat in the path of fluid pressure therethrough, adapted to close the valve when moved into sealing contact with the valve seat,
   a fluid exit chamber adjacent to the valve seat and the diaphragm, and an outlet port in communication therewith,
   a fluid chamber formed in the valve body, and conduit means connecting the fluid chamber with the inlet port so that inlet pressure is present in both the chamber and the port,
   a second diaphragm, positioned in the fluid chamber to receive said inlet pressure, and
   connecting means between the first and second diaphragms providing for opposed movement of the two diaphragms with respect to said inlet pressure, so that inlet pressure acting on the second diaphragm tends to restrain the opening of the valve by exerting a force on the first diaphragm in the direction of the valve seat; and
   linkage means between the solenoid armature and the connecting means, for controlling the movement of the diaphragms and thus the opening and closing of the valve;
   whereby the restraining force provided by the second diaphragm enables the valve to be operated with a small amount of force from the solenoid, even under relatively high inlet pressures.

2. The valve of claim 1 wherein said connecting means between the first and second diaphragms comprises a piston slidably mounted in the valve body, having one end over which the first diaphragm is positioned and an opposite end over which the second diaphragm is positioned.

3. The valve of claim 2 wherein said linkage means includes a lever pivotally mounted on the valve body and connected to the piston.

4. The valve of claim 2, further including a spring biasing the piston toward the fluid chamber, thus toward the valve-open position, said solenoid being disposed to move the piston in the opposite, valve-closed position when energized.

5. The valve of claim 1, further including means associated with said connecting means for normally urging the valve toward the open position, said solenoid being disposed to move the valve toward the closed position when energized.

6. The valve of claim 1 wherein the second diaphragm is of smaller effective area than the first, so that the first diaphragm exerts a greater valve-opening force than the second diaphragm's valve-closing force, said solenoid being disposed to move the valve toward the closed position when energized.

7. The valve of claim 6, further including a spring urging the valve toward the open position.

8. The valve of claim 1 wherein said valve seat is circular and said fluid exit chamber is an annular cavity in the valve body surrounding the valve seat.

9. A solenoid-controlled fluid valve adapted to control high flow pressures with relatively low force, comprising:

a solenoid having a field coil including a housing and a winding, and an armature movable within the field coil between an inner and an outer position, said field coil including a non-magnetic bearing sleeve surrounded by said winding and defining a hollow core open at its outer end, a magnetic metal housing surrounding the winding, and a substantially flat magnetic metal surface adjacent the inner end of the hollow core, perpendicular to the axis of the hollow core, said armature being shaped as a steadily tapered body with a large end and a small end, the armature being oriented with the large end within the field coil and the small end extending outside the field coil such that flow of current through the field coil tends to draw the armature farther into the core, large-end first, said solenoid providing a power output that is substantially constant relative to the position of the armature, so that power output is a substantially linear function of current in the field coil through substantially the entire stroke of the armature;

a valve comprising a valve body, an inlet port in the valve body, a valve seat in the valve body communicating with the inlet port, valve closure means positioned adjacent to the valve seat in the path of fluid pressure therethrough and mounted in the valve body for movement into seating engagement with and away from the valve seat, a fluid exit chamber adjacent to the valve seat and the closure means, and an outlet port in communication therewith, expansible fluid chamber means formed in the valve body and having a movable member responsive to fluid pressure in the chamber means, and conduit means connecting the fluid chamber with the inlet port so that inlet pressure is present in both the chamber and the port, and connecting means between the valve closure means and the movable member for establishing opposed movement of the closure means and the movable member with respect to said inlet fluid pressure, so that inlet pressure acting on the movable member tends to restrain the opening of the valve by exerting a force on the closure means in the direction of the valve seat; and linkage means between the solenoid armature and the connecting means, for controlling the movement of the closure means and the movable member and thus the opening and closing of the valve;

whereby the restraining force of the movable member enables the valve to be operated with a small amount of solenoid force even under relatively high inlet pressures, and whereby the linear characteristics of the solenoid provide for effective control of the valve by the solenoid.

10. The solenoid-controlled fluid valve of claim 9 wherein the housing includes a generally conical opening leading out from the hollow core, generally parallel and concentric with the conical portion of the armature.

11. A solenoid-controlled fluid valve adapted to control high flow pressures with relatively low force, comprising:

a solenoid having a field coil including a housing and a winding, and an armature movable within the field coil between an inner and an outer position, said field coil including a non-magnetic bearing sleeve surrounded by said winding and defining a hollow core open at its outer end, a magnetic metal housing surrounding the winding, and a substantially flat magnetic metal surface adjacent the inner end of the hollow core, perpendicular to the axis of the hollow core, said armature comprising a body member including a first generally hemispherical portion providing an enlarged end and a second conical portion extending therefrom and leading to a small end, said armature being oriented with the large end within the field coil and the small end extending outside the field coil such that the flow of current through the field coil tends to draw the armature farther in, large end first, said solenoid providing a power output that is substantially constant relative to the position of the armature, so that power output is a substantially linear function of current in the field coil through substantially the entire stroke of the armature;

a valve comprising a valve body, an inlet port in the valve body, a valve seat in the valve body communicating with the inlet port, valve closure means positioned adjacent to the valve seat in the path of fluid pressure therethrough and mounted in the valve body for movement into seating engagement with and away from the valve seat, a fluid exit chamber adjacent to the valve seat and the closure means, and an outlet port in communication therewith, expansible fluid chamber means formed in the valve body and having a movable member responsive to fluid pressure in the chamber means, and conduit means connecting the fluid chamber with the inlet port so that inlet pressure is present in both the chamber and the port, and connecting means between the valve closure means and the movable member for establishing opposed movement of the closure means and the movable member with respect to said inlet fluid pressure, so that inlet pressure acting on the movable member tends to restrain the opening of the valve by exerting a force on the closure means in the direction of the valve seat; and linkage means between the solenoid armature and the connecting means, for controlling the movement of the closure means and the movable member and thus the opening and closing of the valve;

whereby the restraining force of the movable member enables the valve to be operated with a small amount of solenoid force even under relatively high inlet pressures, and whereby the linear characteristics of the solenoid provide for effective control of the valve by the solenoid.

* * * * *